D. S. BARTLETT.
Horse Hitch.
No. 31,104.
Patented Jan. 15, 1861.
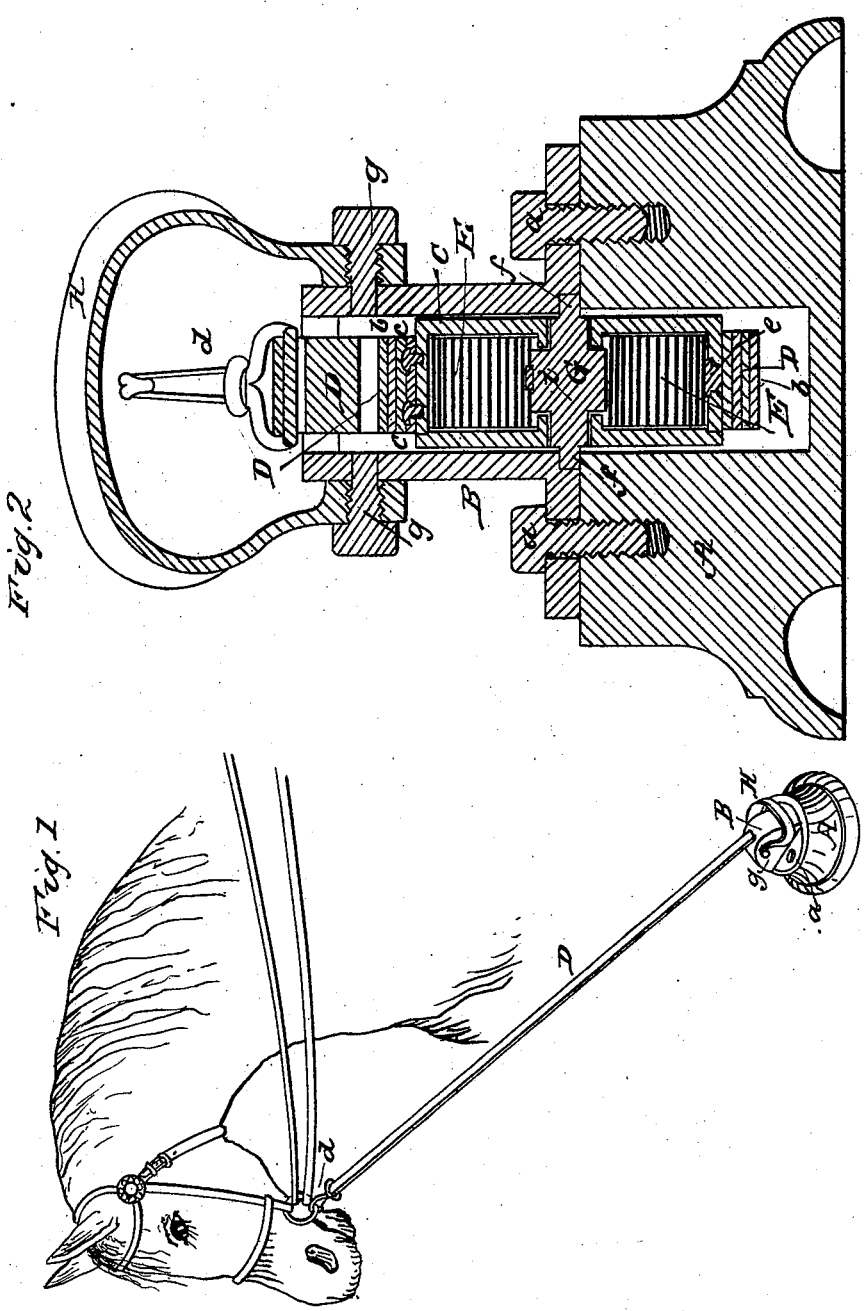

UNITED STATES PATENT OFFICE.

DENNIS S. BARTLETT, OF ROXBURY, MASSACHUSETTS.

WEIGHT AND HITCH-STRAP FOR FASTENING HORSES.

Specification of Letters Patent No. 31,104, dated January 15, 1861.

*To all whom it may concern:*

Be it known that I, DENNIS S. BARTLETT, of Roxbury, in the county of Norfolk and State of Massachusetts, have invented an Improved Weight and Hitch-Strap for Fastening Horses, of which the following is a full, clear, and exact description, reference being had to the accompanying drawing, making part of this specification, in which—

Figure 1 is a view on a reduced scale of the weight and strap as used for securing a horse. Fig. 2 a transverse vertical section through the weight, full size with the hitch strap retracted, or withdrawn into the weight, as it is when not in use.

Physicians and others who in riding about cities have frequent occasions to secure their horses while they leave them to make calls, and who do not always find a hitch post convenient, are in the habit of carrying with them in the vehicle a heavy metal weight which they place on the side walk and to which they attach one end of a strap or chain, the other end of which is hooked or buckled to the bit or bridle of the horse. This answers the purpose of securing the horse, but has the disadvantage that when the horse has been released from it and the weight has been returned to the vehicle, the long strap or chain is liable either to hang from the vehicle and drag in the mud and dirt of the streets, or else to incommode the driver who runs the risk of its catching his feet as he steps from his vehicle.

The object of my present invention is to improve this useful and necessary article, and my invention consists in placing within the block or weight a barrel and spring which shall wind up the hitch strap when it is released from the horse's head, and retract it into the hollow weight where it is out of the way until again required for use.

That others skilled in the art may understand and use my invention I will proceed to describe the manner in which I have carried out the same.

In the said drawings the weight which is made of cast iron or other suitable material is formed of two parts, a base A and a top B secured together by screws $a$. A recess $b$ is formed in both these parts in which is placed a barrel C, around which the hitch strap D is wound, one end of the strap being attached to the barrel by screws $c$, and the other end to which a hook or snap $d$ is attached passing through a suitable slot in the top of the part B. A coiled spring E similar to a clock spring is placed within the barrel C, one end of this spring is attached at $e$ to the barrel and at the other end at $i$ to an axle G around which the barrel revolves freely, but which is itself held from revolving by its square ends $f$ which rest in corresponding recesses formed in the part B of the weight.

When the parts are to be put together, a few turns are first given to the axle G for the purpose of putting a strain on the spring E before the square shoulders $f$ are placed in their recesses; the parts A and B are then screwed together, the spring now retracts the strap D and keeps it wound around the barrel C; when however the strap is to be used, it is drawn out from the weight against the resistance of the spring E and the end $d$ is attached to the horses bit as shown in Fig. 1. When the strap is again released the spring draws it back into the recess in the weight.

A handle H is secured at $g$ to the top of the part B for the convenience of lifting the weight.

The strap being always kept taut by the spring, the horse is not so liable to step over the strap, and drag the weight beneath his feet.

If preferred, (as it may be with some restive horses) a ratchet and pawl may be applied to the barrel C so that the strap will not be pulled upon or retracted by the spring until the pawl is lifted.

What I claim as my invention and desire to secure by Letters Patent is—

The combination of the weight A, B, with the hitch strap D, barrel C, and spring E, the whole arranged and operating substantially as described for the purpose set forth.

D. S. BARTLETT.

Witnesses:
   THOS. R. ROACH,
   P. E. TESCHEMACHER.